Nov. 7, 1972 HIROSHI ARAI ET AL 3,702,205

ANTI-SKID DEVICE FOR AUTOMOTIVE VEHICLES

Filed Oct. 13, 1970 5 Sheets-Sheet 1

INVENTORS
Hiroshi Arai
Akira Nakamura
Atutoshi Okamoto
Shunji Okumura
BY Cushman, Darby & Cushman
ATTORNEYS Nov. 7, 1972  HIROSHI ARAI ET AL  3,702,205
ANTI-SKID DEVICE FOR AUTOMOTIVE VEHICLES
Filed Oct. 13, 1970  5 Sheets-Sheet 2

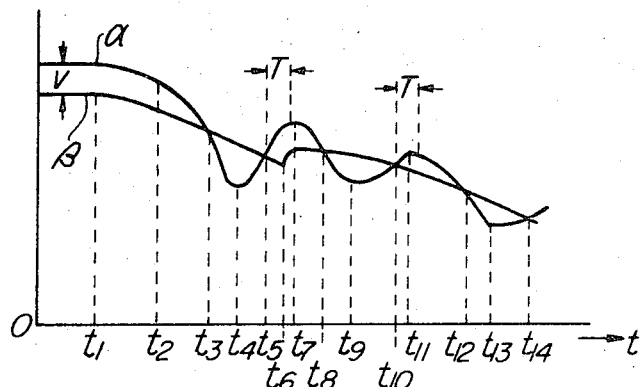
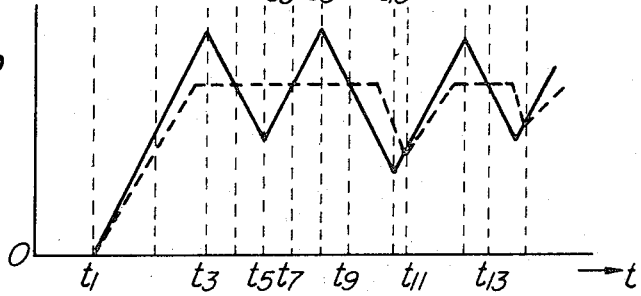
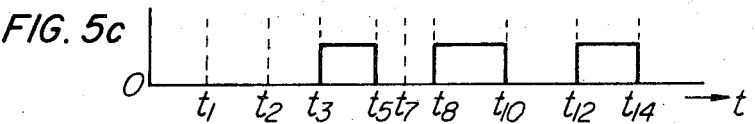
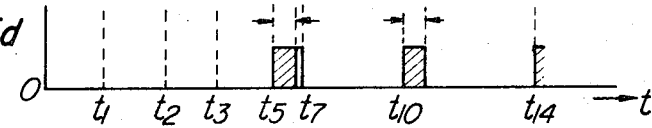
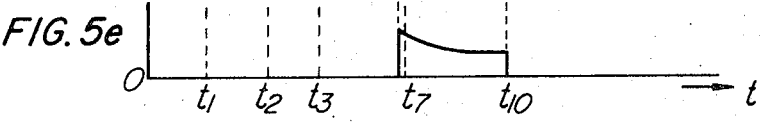
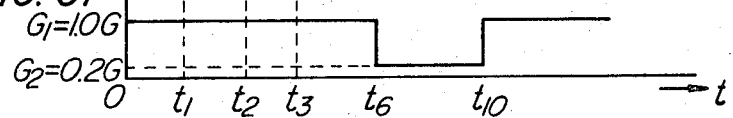

United States Patent Office 3,702,205
Patented Nov. 7, 1972

3,702,205
ANTI-SKID DEVICE FOR AUTOMOTIVE VEHICLES
Hiroshi Arai and Akira Nakamura, Toyota, Atutoshi Okamoto, Toyohashi, and Shunji Okumura, Kariya, Japan, assignors to Toyota Jidosha Kogyo Kabushiki Kaisha, Toyota-shi, and Nippondenso Kabushiki Kaisha, Aichi-ken, Japan
Filed Oct. 13, 1970, Ser. No. 80,431
Claims priority, application Japan, Oct. 18, 1969, 44/83,410
Int. Cl. B60t 8/08
U.S. Cl. 303—21 A                    5 Claims

ABSTRACT OF THE DISCLOSURE

An anti-skid device for an automotive vehicle is disclosed comprising a wheel speed voltage generator for generating a wheel speed voltage corresponding to a wheel speed; a reference wheel speed voltage generator which generates a reference wheel speed voltage corresponding to a reference wheel speed which, being initially lower than a wheel speed, is reduced at a first set decelerating rate with the decrease in wheel speed at the time of braking. A differential amplifier which generates a signal to reduce the braking pressure when said reference wheel speed voltage is higher than said wheel speed voltage; said wheel speed voltage generator, reference wheel speed voltage generator and differential amplifier constituting a lock detector means. A pressure difference detector is provided for generating a signal when the braking pressure of a wheel cylinder is equal to that of a master cylinder; while a control means switches said reference wheel speed voltage generator from a first set decelerating rate to a lower second set decelerating rate when said pressure difference detector generates a signal after the generation of a braking-pressure reducing signal by said differential amplifier; and a braking pressure modulator means reduces the braking pressure according to a signal from said differential amplifier. The maximum value of the friction coefficient between the wheels and a road surface is sought while the maximum tire torque corresponding to said maximum friction coefficient is obtained, to control the braking pressure efficiently and safely on a road surface with any friction coefficient from a frozen road to a concrete-paved road without the locking of wheels, irrespective of the manner in which a vehicle driver applied the braking force to the wheels.

The present invention relates to an anti-skid device for an automotive vehicle or more in particular an anti-skid device which prevents the uncontrollability of a steering wheel and the abnormal spinning of the car body due to the locking of wheels that may be caused when, by the quick application of a brake to the running wheels, the torque derived from the friction between a brake shoe and a brake drum against which the brake shoe is pressed (said torque is referred to as the brake torque BT hereinafter) is excessively high compared with the torque with respect to the wheel center caused on that portion of the wheel which is in contact with a road surface (this torque is hereinafter referred to as the tire torque).

It is known that there is general a relationship as shown in FIG. 1 between the friction coefficient $\mu$ between the wheel and a road surface or the tire torque TT and the slip rate S of the wheel which is expressed as:

$$\frac{\text{body speed SB}-\text{wheel speed SW}}{\text{body speed SB}}$$

The absolute value of the friction coefficient $\mu$ or the tire torque TT greatly varies according to the road condition, said absolute value being great in the case of a dry concrete-paved road and small in the case of a frozen road surface. It is difficult to obtain the friction coefficient $\mu$ between the wheel and the road surface as well as the slip rate S directly from a running vehicle, and therefore an effort is being made to find elements which take the place of the friction coefficient $\mu$ or slip rate S so that the brake torque BT may be controlled ideally by adjusting the brake pressure for all the road surfaces including those with small and large friction coefficients without any locking of a wheel.

The purpose of the conventional device of this kind is to do nothing more than slow down the vehicle speed without locking the wheels. Accordingly, most of the conventional anti-skid devices have been so designed that the peripheral wheel deceleration is either mechanically or electrically detected, whereupon the instant this peripheral deceleration exceeds a preset value, the braking force applied to the wheels is forcibly released to reduce the brake torque BT irrespective of whether or not the driver of the vehicle intentionally releases the braking force, to thereby prevent the locking of the wheels the resulting in uncontrollability of the steering wheel, the skidding of the vehicle and the extraordinary spinning of the vehicle.

However, in the conventional anti-skid devices mentioned above, the peripheral wheel deceleration does not represent the coefficient of friction between the wheel and the road surface or the slip rate S of the wheel, and therefore an ideal control can be achieved on a road surface with some friction coefficient, whereas such a control is impossible on a road surface with other values of friction coefficient, in which case the wheels may often lock despite the anti-skid control or the braking pressure is unnecessarily released, lengthening the distance required for stopping the vehicle. The anti-skid device is thus rendered useless.

Accordingly, it is an object of the present invention to overcome the above-mentioned disadvantages of the conventional device by providing an improved anti-skid device comprising a locking detector means including a generator of a wheel speed voltage corresponding to a wheel speed, a generator of a reference wheel speed voltage corresponding to a reference wheel speed which, being initially lower than a wheel speed, is reduced at a first set decelerating rate with the decrease in wheel speed at the time of braking, and a differential amplifier for generating a signal to reduce the braking pressure when said reference wheel speed voltage exceeds said wheel speed voltage; a pressure-difference detector means for generating a signal when the braking pressure of the wheel cylinder is equal to that of the master cylinder, a control means for switching said reference wheel speed voltage generator means from said first set deceleration rate to a lower second set deceleration rate when said pressure-difference detector generates a signal after the signal generation by said differential amplifier for reducing the braking pressure; and a braking pressure modulating means for reducing the braking pressure according to a signal generated by said differential amplifier.

According to the present invention, the slip rate S at which the friction coefficient between the wheel and the road surface is maximum is found and a tire torque TT corresponding to the maximum friction coefficient is calculated, whereby the brake torque BT is controlled by an ideal adjustment of the braking pressure without the wheel locking on any road surface including a frozen road and dry concrete-paved road. In addition, the device of the present invention has such a fine effect that the wheel is not locked irrespective of how the vehicle driver has applied the braking force, thereby making possible an efficient and safe braking operation in the shortest possible distance required until the stoppage of the car from the application of the brakes.

The above and other objects, features and advantages will be made apparent by the detailed description taken in conjunction with the accompanying drawings, in which:

FIGS. 5a to 5f and FIGS. 6a to 6f show diagrams for explaining the operating principle and actual operation of the anti-skid device according to the present invention.

Figure 2:
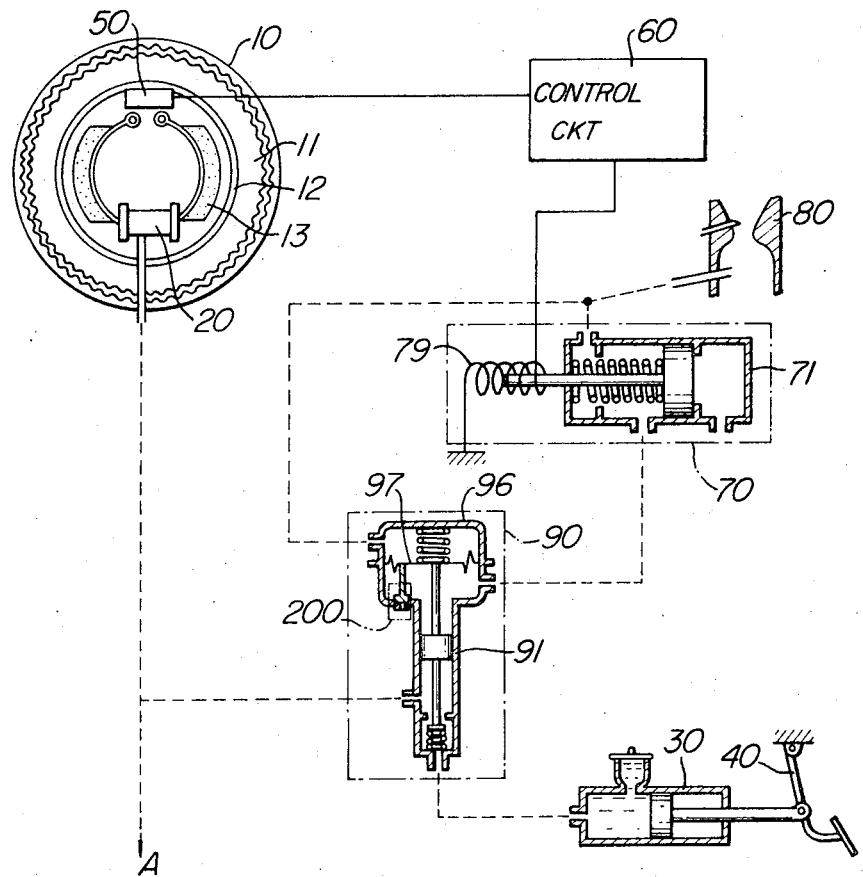
FIG. 2 shows a cross-sectional view of the components of an anti-skid device for an automotive vehicle embodying the present invention.

Referring now to FIG. 2, the reference numeral 10 shows a wheel, the numeral 11 a tire, the numeral 12 a brake drum, and the numeral 13 a brake shoe. The numeral 20 shows a wheel cylinder for generating a hydraulic pressure to press the brake shoe 13 against the brake drum 12. The numeral 30 shows a master cylinder which generates hydraulic pressure in proportion to the amount by which the brake pedal 40 is pushed. The numeral 50 shows a D-C generator acting as a wheel speed voltage generator which generates a D-C voltage corresponding to the preipheral speed of the wheel 10 (hereinafter called "a wheel speed voltage"). The numeral 60 shows a control circuit which receives a wheel speed voltage from the D-C generator 50 and detects a sign of the locking of the wheel 10 due to a sharp drop of the wheel speed voltage, thereby to generate a signal for reducing the brake torque BT by forcibly releasing the braking pressure (hereinafter called "a release signal") irrespective of whether said braking pressure is released by the vehicle driver. The locking detector means comprises the D-C generator 50 and the control circuit 60. The numeral 70 shows a three-way change-over electromagnetic means whose electromagnetic coil 79 receives a release signal from the control circuit 60, actuating the braking pressure modulator means 90, whereby a hydraulic path linking the master cylinder 30 to the wheel cylinder 20 is cut off and at the same time the hydraulic pressure in the wheel cylinder 20 is reduced due to a change in the volume of the chamber thereof, thereby reducing the braking pressure applied on the wheel 10 and also the brake torque BT. The braking pressure modulator means 90 is unable to increase the hydraulic pressure in the wheel cylinder 20 higher than the hydraulic pressure generated by the master cylinder 30. The arrow A in the drawing shows a hydraulic path leading to another wheel cylinder not shown in the drawing. The detail of the construction and operation of the three-way change-over electromagnetic means 70 and the braking pressure modulator means 90 will be described later.

Now let us explain the principle of the control system of the anti-skid device according to the present invention. First of all, it is necessary to compare an actual wheel speed with the reference wheel speed which is lower by a certain amount than the actual wheel speed and slows down at a preset deceleration rate with the decrease in the wheel speed due to the application of the braking force. The pushing of the brake pedal 40 generates a hydraulic pressure in the master cylinder 30, which is transmitted to the wheel cylinder 20. When the brake torque BT becomes excessive and the wheel speed becomes lower than the reference wheel speed, the control circuit 60 generates a release signal. This signal energizes the three-way change-over electromagnetic means 70 and the braking pressure modulator means 90, thereby forcibly reducing the hydraulic pressure in the wheel cylinder 20 and at the same time reducing the brake torque BT. The reduction in brake torque BT causes the wheel speed to start increasing. When the wheel speed exceeds the reference wheel speed, the signal generated by the control circuit 60 dies out, which raises the hydraulic pressure in the wheel cylinder 20, thereby increasing the brake torque BT. The deceleration rate mentioned above is set at a low value if the wheel is being accelerated when the time T has elapsed after the brake torque BT began to increase following the previous decrease. The deceleration rate is maintained unchanged if the wheel is being decelerated at such a time, and it is set at a high value if the previous deceleration rate is small. This operation is repeated.

Figure 1:
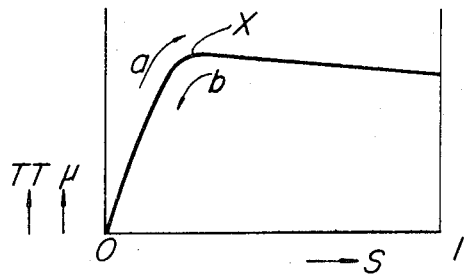
FIG. 1 is graph showing the well-known relationship between the coefficient $\mu$ of friction between a road surface and a wheel and the slip rate S.

In the anti-skid device mentioned above, if the hydraulic pressure of the master cylinder 30 is sufficiently high, the next release signal is supplied from the control circuit 60 while the hydraulic pressure of the wheel cylinder 20 is being increased. As a consequence, the slip rate S at or near the crest of the $\mu$–S curve as shown in FIG. 1 is maintained at 0.15 to 0.20, thereby to achieve an ideal braking operation in the shortest stopping distance without locking the wheel. If the pressure of the master cylinder 30 is not sufficiently high, however, a release signal may be generated after the hydraulic pressure of the wheel cylinder 20 becomes as high as that of the master cylinder 30, and as a result the on-off control may be disturbed, leaving the hydraulic pressure at a fixed level. In such a case, the wheel speed becomes too low during a control operation, causing the wheel to be locked before the vehicle comes to a stop.

The above-described operating principle will be explained more in detail with reference to FIGS. 5a, 5b and 5c. In all of these figures, the abscissa represents the time t at various points. The ordinate in FIG. 5a shows the actual wheel speed $\alpha$ and the reference wheel speed $\beta$. The ordinate in FIG. 5b shows the brake torque BT and the tire torque TT. And the ordinate in FIG. 5c represents a release signal generated by the control circuit 60. Let the high value of the deceleration rate of the reference wheel speed $\beta$ be $G_1$ and the low value thereof be $G_2$. There is the following relationship between the brake torque BT and the tire torque TT during the braking of the wheels:

BT=TT+(torque due to wheel inertia)

This means that the difference between the brake torque BT and the tire torque TT is proportional to the deceleration or acceleration of the wheel. When the brake torque BT is higher than the tire torque TT, the wheel is in a state of deceleration, while if the brake torque BT is lower than the tire torque TT, the wheel is in a state of acceleration. When the vehicle is running under normal conditions no brake is applied, the reference wheel speed $\beta$ is set at a value smaller than the wheel speed $\alpha$ by v. Assume that the brake torque BT is started to be applied to the wheels at the time $t_1$. The wheel speed $\alpha$ begins to be decreased, while the tire torque TT is increased and follows the TT–S curve in FIG. 1 in the direction shown by arrow a. The reference wheel speed $\beta$ is smaller than the actual wheel speed $\alpha$ by v until the wheel peripheral deceleration reaches the set deceleration rate $G_1$, and it begins to slow down at the set deceleration rate $G_1$ from the time $t_2$ when the wheel peripheral deceleration reaches the set deceleration $G_1$. Further, when the wheel speed $\alpha$ is reduced to the point where it begins to be lower than the reference wheel speed $\beta$ at time $t_3$, the control circuit 60 generates a release signal as shown in FIG. 5c, and reduces the brake torque BT, as shown in FIG. 5b by the operation of the three-way change-over electromagnetic means 70 and the braking pressure modulator means 90. The wheel speed $\alpha$ continues to decrease until the time $t_4$, whereas the tire torque TT follows the TT–S curve as shown in FIG. 1 in the direction of arrow a. The brake torque BT further goes down, so that the wheel speed $\alpha$ begins to go upward at the time $t_4$, and when it begins to exceed the reference wheel speed at the time $t_5$, the release signal generated by the control circuit 60 disappears, thereby to increase the brake torque BT. Then, the wheel speed $\alpha$ increases and reaches a level higher than the reference wheel speed $\beta$ by $v$ at time $t_6$, where the relationship between the reference wheel speed $\beta$ and the wheel speed $\alpha$ is the same as before the time $t_3$. With the further increase in brake torque BT, the wheel speed $\alpha$ begins to go down again at time $t_7$. It follows therefore that the wheels are accelerated during the period from time $t_4$ to $t_7$. Also, tire torque TT follows the direction of the arrow $b$ on the TT–S curve in FIG. 1 after time $t_3$, and after passing the crest X, is sharply reduced. If the slip rate S is large at time $t_3$, the period from time $t_5$ to $t_7$ or the period from the point where the wheel speed $\alpha$ becomes accelerated due to the disappearance of the release signal to the point where it is again decelerated is large because the tire torque TT is not reduced despite the brake torque BT being reduced. In other words, if the wheels are being accelerated after the duration of time T from the point $t_5$ where brake torque BT begins to rise, it means that the slip rate S of the wheels at the point $t_5$ is higher than the level near or at the crest X of the $\mu$–S curve as shown in FIG. 1. As a result, the small value $G_2$ is selected as the next set deceleration to lessen the reduction in the wheel speed $\alpha$, thereby bringing the slip rate S to a smaller value i.e., towards the crest X. The above operation is repeated, and if the slip rate S is smaller than the value at or near the crest X of the $\mu$–S curve as shown in FIG. 1 and so the tire torque TT is being reduced, the period is smaller between the point $t_{10}$ where the brake torque BT begins to follow an upward curve and the point $t_{11}$ where the wheel speed $\alpha$ becomes again decelerated. Hence, the wheels are decelerated after the time T from the point $t_{10}$. Then the large value $G_1$ is selected as the next set deceleration to reduce the wheel speed $\alpha$, thereby to bring the slip rate S to a higher level or toward the crest X. In the above description, consideration is given only to the difference between the brake torque BT and the tire torque TT, namely, the acceleration and deceleration of the wheels, and not to the absolute value of the tire torque TT. In determining said time T, the gradient in which the brake torque BT is increased should be taken into account. Through the above-mentioned operation, a value as near the crest X of the $\mu$–S curve as possible is reached to control the tire torque TT, enabling an ideal anti-skid operation.

Figure 6A:
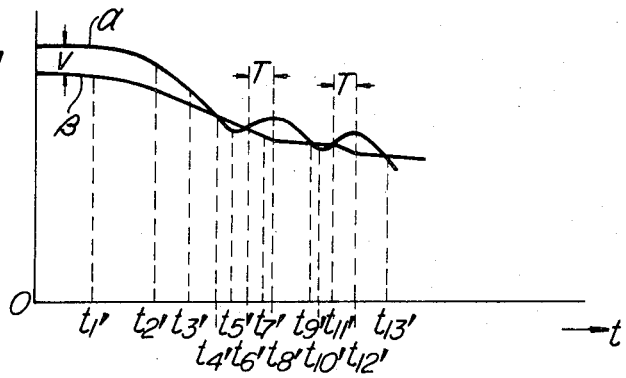
Figure 6B:
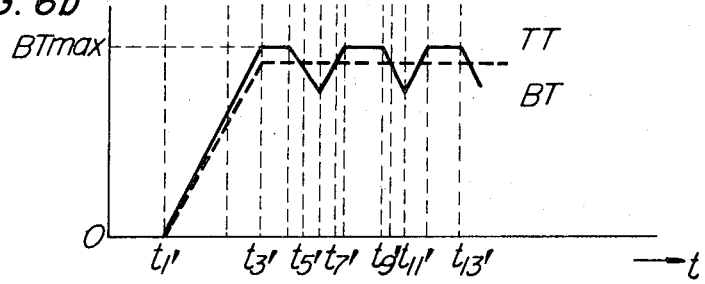

The above description in which the brake torque BT rises during the period from time $t_1$ to $t_2$, from time $t_5$ to $t_8$, and from $t_{10}$ to $t_{12}$ presupposes that the hydraulic pressure of the master cylinder 30 is sufficiently high. However, if the hydraulic pressure of the master cylinder 30 is not high enough, a release signal is generated only after the hydraulic pressure of the wheel cylinder 20 increases to a level equal to that of the master cylinder 30. The operation of the anti-skid device in this case is described below with reference to FIGS. 6a, 6b and 6c. The abscissas in these drawings, like those in FIGS. 5a, 5b and 5c show the various points of the time $t$. The ordinate in FIG. 6a shows the wheel speed $\alpha$ and the reference wheel speed $\beta$. The ordinate in FIG. 6b represents the brake torque BT and the tire torque TT and the ordinate in FIG. 6c a release signal. Assume that the maximum value of the brake torque BT is BT$_{max}$ or a value slightly higher than the tire torque TT, when the hydraulic pressure of the master cylinder is maintained at a level not sufficiently high. In this case, the operation is the same as that made with reference to FIG. 5 before the time $t_3'$. Starting at the time $t_3'$, the brake torque BT is maintained constant at BT$_{max}$, without increasing the wheel deceleration any further. At the time $t_4'$ when the wheel speed $\alpha$ begins to be smaller than the reference wheel speed $\beta$, the brake torque BT begins to be reduced. When the wheel speed $\alpha$ exceeds the reference wheel speed $\beta$ at $t_6'$ after starting to increase at $t_5'$, the brake torque BT begins to increase. However, since the difference between the brake torque BT and the tire torque TT or the wheel deceleration at the time $t_4'$ is small and the average wheel deceleration at $t_4'$ and $t_5'$ is equal to the set deceleration $G_1$, the wheel acceleration or the difference between the tire torque TT and the brake torque BT at $t_6'$ becomes small if the wheel deceleration at $t_4'$ is small. As a result, even if the slip rate S at $t_6'$ is larger than the value at or near the crest X of the TT–S curve as shown in FIG. 1, the period of time from $t_6'$ to $t_7'$ becomes small and, after the elapse of time T from the point $t_6'$ when the brake torque BT begins to increase, the wheels becomes decelerated, whereby the next set deceleration assumes the large value G, with the result that the slip rate S is further increased. That is to say, in the case where the generation of a release signal is made only after the not sufficiently high hydraulic pressure of the master cylinder 30 becomes equal to that of the wheel cylinder 20, the set deceleration may assume the large value $G_1$ only, which may result in a locking of the wheels before the car body has not come to a stop on a road surface with a low friction coefficient. To prevent this, when the hydraulic pressure of the master cylinder 30 becomes equal to that of the wheel cylinder 20, it is recommended that the small value $G_2$ be selected as the next set deceleration in order to decrease the slip rate S. In such a case, it may happen that the slip rate S is excessively decreased. This inconvenience is avoided by the above-described complete on-off control due to a sufficiently high hydraulic pressure of the master cylinder 30, that is, by establishing a state where the hydraulic pressure of the master cylinder 30 never becomes equal to that of the wheel cylinder. Thus an ideal control is achieved, reaching the crest X of the $\mu$–S curve in FIG. 1.

Figure 3:
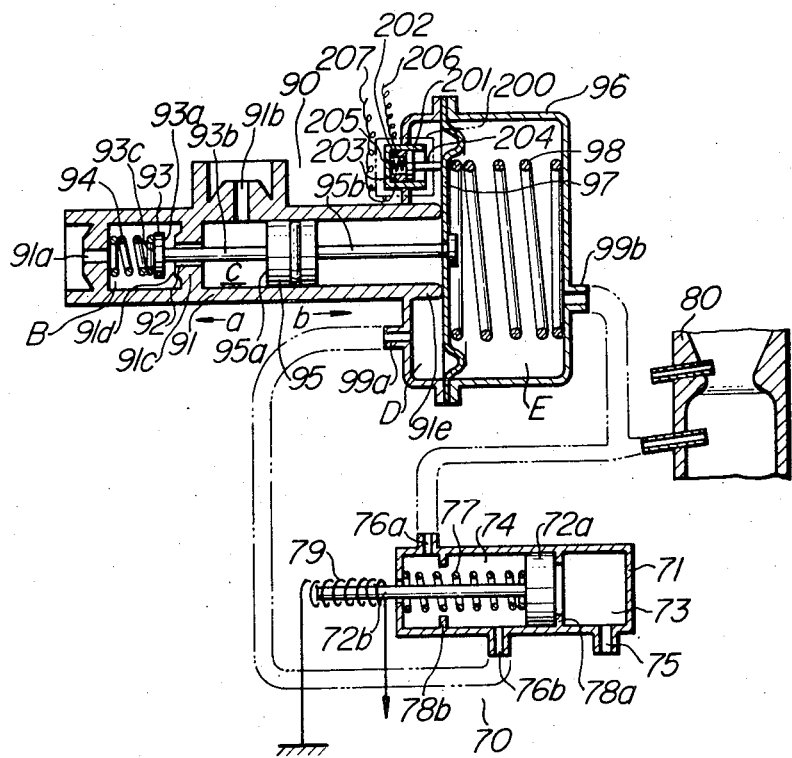
FIG. 3 is a diagram showing a longitudinal section of a three-way change-over electromagnetic means and a braking pressure modulator means embodying the present invention.

Explanation will be made below of an embodiment of the present invention based on tthe operating principle mentioned above. First, the construction of the three-way change-over electromagnetic means 70 and the braking pressure modulator means 90 will be described with reference to FIG. 3. In the figure, the three-way change-over electromagnetic means 70 is inserted into the cylinder body 71 in such a way that the piston 72a can slide. The chambers 73 and 74 are formed with the piston 72a as a partition therebetween. The chamber 73 is open to the air at all times through the hole 75, while the other chamber 74 is connected to the suction pipe 80 of the vehicle engine through the hole 76a so that the negative pressure is introduced into the suction pipe 80. Also, the chamber 74 is connected to the chamber D of the braking pressure modulator means 90 through another hole 76b. The numeral 77 shows a spring disposed in the chamber 74, which presses the piston 72a toward the chamber 73 until its movement is stopped by the block 78a. The numeral 72b shows a working rod attached to the piston 72a, the numeral 79 an electromagnetic coil which, by the release signal from the control circuit 60, attracts the piston 72a against the elasticity of the spring 77 into contact with the block 78b to the position shown by the chain line, thereby cutting off the connection between the holes 76a and 76b and at the same time connecting the hole 76b with the hole 75. The numeral 90 shows the braking pressure modulator means in which 91 is a hydraulic cylinder, 91a is a hole provided on the end wall of the hydraulic cylinder 91 and connecting it to the master cylinder 30, 91b a hole provided on the side wall of the hydraulic cylinder 91 and connecting it to the wheel cylinder 20, 91c a partition disposed inside the hydraulic cylinder 91 and provided with the hole 92 which connects the holes 91a and 91b to each other. The symbol B shows a chamber formed between the end wall and the partition 91c of the hydraulic cylinder 91, and the numeral 91d shows a valve seat provided along the rim of the hole 92 on the side of chamber B. The numeral 93 shows a valve for cutting off the hydraulic pressure with the valve face 93a situated opposite to the valve seat 91d and with its floating foot 93b inserted through the partition hole 92. The numeral 94 shows a spring which is placed on the side of the head 93c of the valve 93 in the chamber B to supply the power to press the valve 93 against the valve seat 91d. The numeral 95 shows a hydraulically-operated piston from which the driving force to open or close the valve 93 is derived and which is disposed inside the hydraulic cylinder 91 in such a manner as to slide in the longitudinal direction with its head 95a in contact with the edge of the foot 93b of the valve 93. The symbol C shows a chamber formed between the partition 91c and the head 95a of the hydraulic piston 95, the holes 91b and 92 being provided through the wall of the chamber C. The numeral 96 shows a power cylinder formed integrally with the hydraulic cylinder 91, the numeral 97 showing a diaphragm, on both sides of which chambers D and E are formed. The numeral 98 shows a spring which presses the diaphragm 97 into contact with the projection 91e at the end of the hydraulic cylinder 91. The numeral 95b shows a connecting rod which transmits the displacement of the diaphragm 97 to the hydraulic piston 95, thereby to cause its reciprocating motion. For that purpose, one end of the connecting rod is fixed at the center of the diaphragm 97, the other end being connected to the hydraulic piston 95. The hole 99a opens to the chamber D and connects it to the chamber 74 of the three-way change-over electromagnetic means 70. The numeral 99b shows a hole which opens to the inside of the chamber E and connects it to the suction pipe 80 of the vehicle engine in such a manner as to introduce the negative pressure of the engine into the chamber E. The numeral 200 shows a pressure difference detector which consists of a box 201, a couple of electrodes 202 and 203 placed therein, a movable contact 204 and a spring 205. An end of the movable contact 204 is maintained in contact with the diaphragm 97 by the force of the spring 205. When the diaphragm 97 is pressed into contact with the projection 91e or no release signal is produced, the movable contact 204 is pressed into contact with the electrodes 202 and 203 against the elastic strain of the spring 205 by the diaphragm 97, thereby electrically connecting the two electrodes. On the other hand, when the diaphragm 97 is detached from the projection 91e or a release signal is produced, the movable contact 204 is also detached from the electrodes 202 and 203 thereby to cut off the conduction between the electrodes. The numerals 206 and 207 show lead wires for the electrodes 202 and 203 respectively.

The operation of the above-mentioned three-way change-over electromagnetic means 70, braking pressure modulator means 90 and pressure difference detector 200 will be described below. When the control circuit 60 does not generate any release signal, there is no conduction in the electromagnetic coil 79 of the three-way change-over electromagnetic means 70 and so the piston 72a is pressed into contact with the block 78a through the spring 77, introducing the negative pressure of the engine into the chamber 74 and further into the chamber D of the braking pressure modulator means 90. Since the negative pressure of the engine is always introduced into the chamber E of the braking pressure modulator means 90, the chambers D and E have the same pressure level. As a result, the diaphragm 97 is pressed against the projection 91e by the spring 98, resulting in the hydraulic piston 95 and the valve 93 being pushed in the direction of arrow a and detaching the valve face 93a of the valve 93 from the valve seat 91d. The path of the hydraulic pressure leading from the master cylinder 30 to the wheel cylinder 20 includes the hole 91a, chamber B, hole 92, chamber C and hole 91b. The hydraulic pressure generated in the master cylinder 30 is transmitted to the wheel cylinder 20 exactly, making ordinary control possible. In this case, the diaphragm 97 is in contact with the block 91e and therefore the movable contact 204 of the pressure difference detector 200 is also in contact with the electrodes 202 and 203, electrically connecting the electrodes with each other. Under this condition, the hydraulic pressure generated in the master cylinder 30 upon the depression of the brake pedal 40 is transmitted to the wheel cylinder 20 and teh wheel speed becomes lower than the reference wheel speed, causing the control circuit 60 to generate a release signal, whereby the electromagnetic coil 79 of the three-way change-over electromagnetic means 70 is energized. Then, the piston 72a is attracted toward the block 78b against the elastic strain of the spring 77 until it comes into contact with said block 78b, thereby cutting off the connection between the holes 76a and 76b and at the same time connecting the holes 76b and 75 with each other. As a consequence, atmospheric air enters the chamber D of the braking pressure modulator means 90, while the negative pressure of the engine is present in the chamber E at all times. The resulting difference in pressure between the chambers D and E causes the diaphragm 97 to be pushed toward the chamber E against the elastic strain of the spring 98. Then, the hydraulic piston 95 begins to move, which applies pressure to the valve 93 despite the elastic strain of the spring 94, thereby bringing the valve face 93a into contact with the valve seat 91d. Consequently, the hole 92 is closed and the path of hydraulic pressure from the master cylinder 30 to the wheel cylinder 20 is cut off. The movement of the hydraulic piston 95 in the direction of arrow b increases the volume of the chamber C, which reduces the brake torque by forcibly lowering the hydraulic pressure of the wheel cylinder 20 irrespective of whether the driver's foot is released from the brake pedal 40 or not. At the same time, the movable contact 204 of the pressure difference detector 200 is detached from the electrodes 202 and 203 by the spring 205, cutting off the conduction between the electrodes 202 and 203. When the release signal from the control ciricuit 60 disappears as the result of the subsequent gain in wheel speed, the electromagnetic coil 79 of the three-way change-over electromagnetic means 70 is de-energized, with the result that the three-way change-over electromagnetic means 70 again introduces into the chamber D of the braking pressure modulator means 90 the negative pressure of the engine. The result is the elimination of the pressure difference between the chambers D and E with both of the chambers maintaining the same level of the negative pressure due to the engine suction, whereby the diaphragm 27 is pushed to the side of the chamber D by the tension of the spring 98. This causes the movement of the hydraulic piston 95 in the direction of the arrow a, thereby to reducing the volume of chamber C and as a result raising the hydraulic pressure of the wheel cylinder 20. The movement of the hydraulic piston 95 also detaches the valve face 93a of the valve 93 from the valve seat 91d, whereby the hole 92 is opened, making the hydraulic pressure in the wheel cylinder 20 equal to that in the master cylinder 30, which in turn applied to the brake torque BT again to the wheels. At this time, the electrodes 202 and 203 of the pressure difference detector 200 are electrically connected to each other.

Now the operation of the pressure difference detector 200 will be explained with reference to FIG. 6d. During the period on or before time $t_1'$ when the brake torque BT begins to be applied ot the wheels and from $t_1'$ to $t_4'$ when a release signal is generated, the three-way change-over electromagnetic means 70 is not in operation and so the diaphragm 97 is maintained in contact with the block 91e by the spring 98, keeping the movable contact 204 also in contact with the electrodes 202 and 203, which are therefore electrically connected with each other. On the other hand, the hole 92 is opened as the valve 93 is pushed by the hydraulic piston 95, the hydraulic pressure generated in the master cylinder 30 being transmitted through the hole 92 to the wheel cylinder 20. Then, at the time $t_4'$ when a release signal is generated, the electromagnetic coil 79 of the three-way change-over electromagnetic means 70 is energized to move the diaphragm 97 toward the chamber E and at the same time to cut off the connection between the electrodes 202 and 203 of the pressure difference detector 200, thereby causing the valve 93 to be pressed by the spring 94. As a result, the hole 74 is closed and the hydraulic path between the master cylinder 30 and the wheel cylinder 20 is cut off. The relocation of the hydraulic piston 95 also reduces the hydraulic pressure of the wheel cylinder 20 and therefore the brake torque BT. Subsequently, when the wheel speed $\alpha$ exceeds the reference wheel speed $\beta$ to extinguish the release signal at time $t_6'$, the diaphragm 97 is again brought into contact with the block 91e, causing electrical connection between the electrodes 202 and 203 of the pressure difference detector 200. This occurs at a time when the hydraulic pressure in the chamber C rises to a level as high as that in the chamber B and as a result the valve 93 is pressed by the hydraulic piston 95 to thereby open the hole 92. At this time, if the hydraulic pressure generated in the master cylinder 30 is sufficiently high, a release signal is generated before the pressing of the valve 93 is completed. Therefore, the electrodes 202 and 203 of the pressure difference detector 200 will never be connected electrically with each other at or after time $t_8'$.

Figure 4:
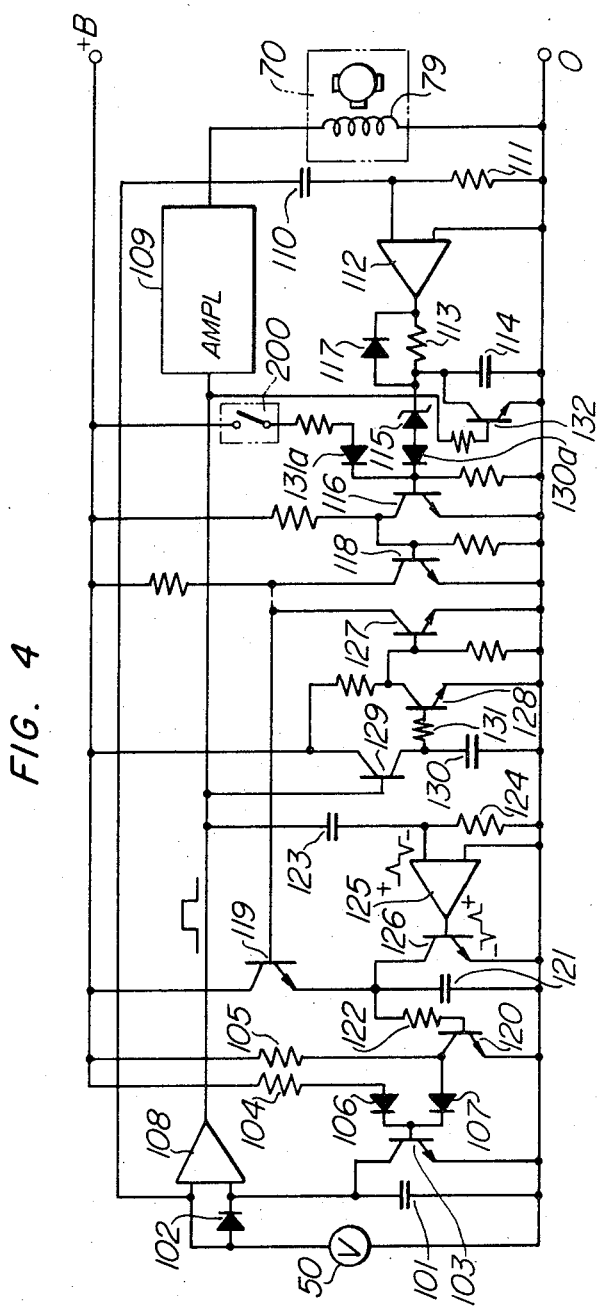
FIG. 4 shows an electric circuit diagram of a control circuit of an embodiment.

In the next place, the arrangement of the locking detector means including the D-C generator 50 and the control circuit 60 will be described below with reference to FIG. 4. The numeral 50 shows a D-C generator acting as a wheel speed voltage detector coupled to the wheel shaft and which generates a wheel speed voltage corresponding to the wheel speed. It does not weaken the effect of this invention if the D-C generator mentioned above is replaced by a combination of an A-C generator and a rectifier circuit or the one of a pulse generator and a D-A converter circuit. The numeral 101 shows a capacitor which is charged by the wheel speed voltage from the D-C generator 50 and the numeral 102 shows a diode for preventing the charges stored in the capacitor 101 from flowing back to the D-C generator 50. The numeral 103 shows a transistor which discharges the charges stored in the capacitor 101 at a time constant corresponding to a predetermined deceleration of, say, 10 G. (G shows the acceleration of gravity), generating at both ends of the capacitor 101 a voltage corresponding to a reference wheel speed (hereinafter called the reference wheel speed voltage) which is reduced at a predetermined deceleration. The numerals 104 and 105 show resistors which determine the base current or collector current of the transistor 103, and further determine the time constant for the discharge of the capacitor 101 or the set deceleration. The diodes 106 and 107 are provided for preventing the mutual interference of currents flowing through the resistors 104 and 105. The numeral 108 shows a differential amplifier which, comparing the wheel speed voltage from the D-C generator 50 with the reference wheel speed voltage across the capacitor 101, is so constructed that a release signal is generated if the former is lower than the latter and the release signal dies out if the former is higher than the latter. The numeral 109 is a power amplifier which power-amplifies the release signal from the differential amplifier 108 to such an extent that the three-way change-over electromagnetic means 70 is energized. The numeral 79 shows an electromagnetic coil of the three-way change-over electromagnetic means 70. The capacitor 110 and the resistor 111 make up a differentiation circuit which detects the result of differentiating the wheel speed voltage from the D-C generator 50 with respect to time, namely, the acceleration and deceleration of the wheel speed. In other words, the differentiation circuit determines whether the wheels are being accelerated or decelerated. The numeral 112 shows another differential amplifier which compares the above-mentioned result of differentiation with the zero potential and generates a positive output voltage if said result of differentiation is positive or acceleration is indicated, a zero or negative output voltage being generated if it is negative or deceleration is indicated. Incidentally, the source voltage in the present embodiment is positive. The resistor 113 and the capacitor 114 make up an integration circuit or a timing circuit. Assume that an acceleration signal which is supplied to the differential amplifier 112 to make its output voltage positive continues over a certain period of time, say, 100 ms. which is determined by the time constant due to the resistor 113 and the capacitor 114 and by the Zener voltage of the constant voltage diode 115. Then a base current flows in the transistor 116 through the constant voltage diode 115, thereby to conduct said transistor 116. On the other hand, if the acceleration signal supplied to the differential amplifier continues for a period shorter than said certain time, the electric charges stored in the capacitor 114 are discharged to the ground through a circuit consisting of the diode 117 and the differential amplifier 112, so that said certain time is not affected when the next acceleration signal is supplied to the differential amplifier 112. The numeral 132 shows a transistor which short-circuits the ends of the capacitor 114 while a release signal is being generated, in such a manner that the above-mentioned timing circuit determines the duration of an acceleration signal supplied to the differential amplifier only after the release signal has disappeared. Also, since the base of the transistor 116 is connected with the pressure difference detector 200, a current flows in the base of the transistor 116 when the electrodes 202 and 203 of the pressure difference detector 200 are electrically connected to each other, and conduction takes place in the transistor 116. The diodes 130a and 131a are provided to prevent the interference between the currents flowing through the constant voltage diode 115 and the pressure difference detector 200. The numerals 118, 119 and 120 show transistors which, like the transistor 116, act as a switch. The transistor 118 is cut off when, after the disappearance of a release signal, an acceleration signal is supplied to the differential amplifier 112 continuously for more than a certain period of time or when the electrodes 202 and 203 are electrically connected to thereby conduct the transistor 116. Then the source voltage is applied to the base of the transistor 119 to conduct it and charges the capacitor 121. When the voltage across the capacitor 121 exceeds the base cut-off voltage of the transistor 120, conduction begins in the transistor 120 and the current which otherwise would flow through the resistor 105 into the base of the transistor 103 flows through the collector and emitter of the transistor 120, a current flowing in the base of the transistor 103 only through ther esistor 104. As a result, the base current or the collector current of the transistor 103 becomes smaller, which means a larger time constant for the discharge of the capacitor 101. In other words, the set deceleration of the reference wheel speed is changed into a lower second fate of 0.2 G from the first rate of 1.0 G. Even after the transistor 119 is cut off, the transistor 120 receives at its base a discharge current from the capacitor 121 and continues its conduction for a period of time determined by the time constant due to the capacitor 121 and the resistor 122. After that period, the transistor 120 is cut off and the set deceleration returns from the second rate of 0.2 G. to the first one of 1.0 G. The numerals 123 and 124 show a capacitor and a resistor respectively which make up a differentiation circuit, and the numeral 125 shows an amplifier to amplify the output of the differentiation circuit. A positive pulse signal can be obtained through this differentiation circuit when a release signal generated by the differential amplifier 108 disappears. The numeral 126 shows a transistor which begins to conduct when it receives at its base a positive pulse signal from the amplifier 125, thereby causing the electric charges stored in the capacitor 121 to be quickly discharged. Thus the transistor 120 is cut off, switching the reference wheel speed from 0.2 G. to 1.0 G. The transistors 127, 128 and 129 constitute a release signal holding circuit. This release signal holding circuit is included to prevent a switching from the first deceleration of 1.0 G. to the second of one 0.2 G. from taking place in the absence of a release signal, that is to say, to prevent the generation of the source voltage across the capacitor 121 due to the conduction of the transistor 116 and the cut-off of the transistor 118 when the wheels are accelerated or decelerated or when the electrodes 202 and 203 of the pressure difference detector 200 are electrically connected with each other. The transistors 127 and 118 make up an "AND" circuit. The numerals 130 and 131 show a capacitor and a resistor respectively. When the wheel deceleration exceeds the first set deceleration rate of the reference wheel speed and a release signal is generated by the differential amplifier 108, the transistor, receiving said release signal at its base, begins to conduct and the capacitor 130 is charged by the source voltage. When the voltage across the capacitor 130 exceeds the base cut-off voltage of the transistor 128, the transistor 128 conducts and the transistor 127 is cut off. Even after the transistor 129 is cut off as a result of the disappearance of a release signal, the transistor 128 receives at its base a discharge current from the capacitor 130 and continues conduction for a certain period of time, say, 0.5 second, determined by the time constant due to the capacitor 130 and the resistor 131, the transistor 127 being maintained cut off for said certain period of time. In this way, the transistors 119 and 120 conduct only when the transistors 118 and 127 are kept cut off. In other words, even when the transistor 118 is cut off, the current which would otherwise flow in the base of the transistor 119 flows through the collector and emitter of the transistor 127 if the transistor 127 is maintained in a conducting state. As a consequence, the transistor 119 does not conduct and the set deceleration of the reference wheel speed remains at the first rate of 1.0 G. The transistors 119 and 120 conduct and therefore the set deceleration of the referenc wheel speed is switched from the first rate 1.0 G. to the second rate of 0.2 G. only when the electrodes 202 and 203 of the pressure difference detector 200 are electrically connected with each other or when an acceleration signal is continuously supplied to the differential amplifier 112 for more than a certain period of time after the disappearance of a release signal during the period of the cutting off of the transistor 127 determined by the time constant due to the capacitor 130 and the resistor 131, after the generation of a release signal by the differential amplifier 108. Under normal conditions, the second decelerating rate of 0.2 G. will never be indicated.

Figure 6C:
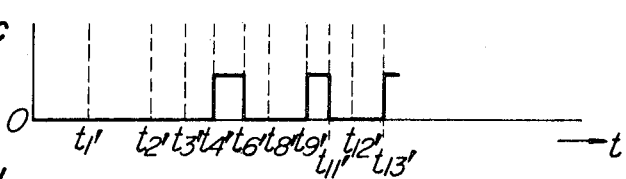
Figure 6D:
Figure 6E:
Figure 6F:
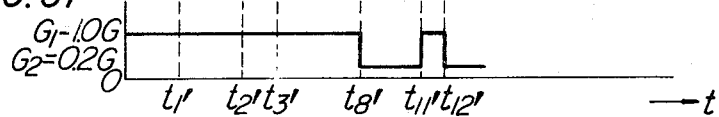

The following is the explanation of the operation of the anti-skid device according to the present invention with reference to FIGS. 5a to 5f and FIGS. 6a to 6f. FIG. 5 shows diagrams of the anti-skid operation with a sufficiently high hydraulic pressure generated in the master cylinder, while FIG. 6 shows the anti-skid operation in the absence of a sufficiently high hydraulic pressure. The abscissas of FIGS. 5a to 5f and 6a to 6f show various points of time. The ordinates in FIGS. 5a and 6a show the wheel speed $\alpha$ and the reference wheel speed $\beta$, those in FIGS. 5b and 6b show the brake torque BT and the tire torque TT, those in FIGS. 5c and 6c show a release signal generated by the differential amplifier 108, that in FIG. 5d shows a wheel acceleration signal supplied to the differential amplifier 112, that in FIG. 6d shows an "on" or "off" signal respectively indicating the connection and disconnection of the electrodes 202 and 203 of the pressure difference detector 200, those in FIGS. 5e and 6e show a voltage across the capacitor 121 due to the charge and discharge thereof, and those in FIGS. 5f and 6f show the first and second set deceleration rates respectively. Firstly, referring to FIG. 4, when the vehicle is running under normal conditions, the capacitor 101 is charged through the diode 102 by a wheel speed voltage applied from the D-C generator 50. The reference wheel speed voltage appearing across the capacitor 101 is lower than the wheel speed voltage by the forward voltage drop in the diode 102 (which is equivalent to $v$ as shown in FIG. 5a). Therefore, no release signal is generated by the differential amplifier 108. As shown in FIG. 5a, at the point $t_1$ when the brake torque BT is applied to the wheels, the wheels begin to be decelerated, and at the point $t_2$ when the wheel deceleration exceeds the first set deceleration rate of 10 G. of the reference wheel speed, the capacitor 101 begins to discharge at the same rate as the first set deceleration rate of 10 G. with the voltage across the capacitor 101 at that time as the initial speed voltage. Then, at the point $t_3$, the wheel speed voltage supplied from the D-C generator 50 becomes lower than the reference wheel speed voltage across the capacitor 101 and a positive release signal as shown in FIG. 5c is generated by the differential amplified 108. This signal, after being power-amplified by the power amplifier 109, is applied to the electromagnetic coil of the three-way change-over electromagnetic means 70, and the hydraulic pressure in the wheel cylinder, namely, the braking force is forcibly reduced by the braking pressure modulator means 90, thereby to reduce the brake torque BT. As a result, the wheel speed $\alpha$ is increased due to the inertia force of the car body and also the tire torque TT generated by the friction with the road surface. The reason why the wheel speed $\alpha$ continues to decrease during the period from the point $t_3$ to $t_4$ despite the generation at the point $t_3$ of a release signal as shown in FIG. 5a is that because of the time lag caused in the operation of the three-way change-over electromagnetic means 70 and the braking pressure modulator means 90 the hydraulic pressure of the wheel cylinder begins to be reduced not the instant a release signal is generated, but along a certain pattern of the fall curve. The generation of a release signal causes the wheel speed $\alpha$ to rise and at the same time the wheel speed voltage to begin rising at the point $t_4$. When the wheel speed voltage exceeds the reference wheel speed voltage at the point $t_5$, the release signal from the differential amplifier 108 dies out. By the way, the release signal continues to be generated as long as the wheel speed voltage is lower than the reference wheel speed voltage. With the disappearance of the release signal, a negative pulse voltage is generated at the ungrounded end of the resistor 124 which, together with the capacitor 123, makes up a differentiation circuit. Then, the amplifier 125 generates a positive output pulse, which conducts the transistor 126. And, electric charges stored, if any, in the capacitor 121 are quickly discharged through the collector and emitter of the transistor 126. In this case, assume that, as mentioned earlier, the slip rate S at the time $t_5$ is higher than the crest X of the $\mu$–S curve as shown in FIG. 1, it takes a long time before the slip rate S passes the crest X. That is to say, the rise time of the wheel speed is long and therefore the charge speed and the charge voltage of the capacitor 101 are low. But because of the long time required to charge it, the period of time for which the accelerating signal is applied to the differential amplifier 112 after the disappearance of a release signal becomes longer, as shown in FIG. 5d, than the time T, for example 100 ms., which is predetermined by the time constant due to the resistor 113 and the capacitor 114 and by the Zener voltage of the constant voltage diode 115. As a result, a current flows into the base of the transistor 116 through the constant voltage diode 115, thereby to conduct the transistor 116 and to cut off the transistor 118. On the other hand, with the generation of a release signal, the transistor 127, as described above, is maintained cut off for a certain period of time, for example, 0.5 second which is predetermined by the time constant due to the capacitor 130 and the resistor 131. Since the time required for the wheels to rise and for the transistor 118 to be cut off is 100 ms., the transistor 118 begins conduction while the transistor 127 is in a cut-off state, thereby to charge the capacitor 121, as shown in FIG. 5e. Then the transistor 120 conducts, and the set deceleration of the reference wheel speed $\beta$ is switched from the first set deceleration 10 G. to the second set deceleration 0.2 G. This second set deceleration disappears, for the reason mentioned earlier, at time $t_{10}$ when the release signal which is generated at time $t_8$ disappears.

Then assume that the slip rate S at time $t_{10}$ is very near the crest X of the $\mu$-S curve as shown in FIG. 1. The period of time before time $t_{11}$ when the wheel speed $\alpha$ begins to be again reduced becomes shorter, that is to say, the rise time of the wheel speed $\alpha$ follows a gentle curve and is short. Therefore, the period of time for which the acceleration signal is applied to the differential amplifier 112 after the disappearance of a release signal does not exceed a certain time T, for example, 100 ms. As a consequence, the set deceleration of the reference wheel speed $\beta$ is not switched from 1.0 G to 0.2 G.

In the next place, a controlling operation needed when the hydraulic pressure in the master cylinder 30 is not sufficiently high will be expained below with reference to FIG. 6. The operation before the time $t_6'$ will be omitted from the explanation as it is exactly the same as that explained above with reference to FIG. 5. The release signal disappears at time $t_5'$, but since the wheel speed $\alpha$ continues to be accelerated and the hydraulic pressure generated in the master cylinder 30 is not sufficiently high, the hydraulic pressure in the wheel cylinder 20 which is being raised reaches the same level of that in the master cylinder 30 at time $t_6'$. As a result, the diaphragm 97 of the braking pressure modulator means 90 is pressed into contact with the block 91e, thereby to electrically connect the electrodes 202 and 203 of the pressure difference detector 200 with each other. As a consequence, even if there is no current flowing in the constant voltage diode 115, a current flows into the base of the transistor 116 through the electrodes 202 and 203 and the diode 131a, starting the conduction of the transistor 116 and cutting off the transistor 118. At the same time, the transistor 127 of the release signal holding circuit is maintained in a cut-off state for a certain time, say, 0.5 second even after the disappearance of the release signal and therefore the transistors 118 and 127, which are both cut off, make up an "AND" circuit, resulting in the transistors 119 and 120 being conducted. Consequently, the set deceleration of the reference wheel speed $\beta$ is switched from the first set deceleration of 10 G. to the second set deceleration of 0.2 G. as shown in FIG. 6f. This second set deceleration of 0.2 G. disappears at time $t_{11}'$ when the release signal which is generated at time $t_7'$ disappears. Since the electrodes 202 and 203 of the pressure difference detector 200 are connected with each other before time $t_4'$ when the first release signal is generated, the transistor 116 is conducted and the transistor 118 is cut off thereby to conduct the transistor 119. As a result, the capacitor 121 is almost charged, but will never be charged and therefore the second set deceleration of 0.2 G. will never be developed because the transistor 127 of the release signal holding circuit is maintained in a conduction state before the first release signal is generated.

The present invention is not limited to the above-mentioned embodiment, but includes all the applications which are in keeping with the spirit of the invention. To cite a few examples, instead of a hydraulic pressure-type drum described in the above embodiment, a braking device of a vehicle to which the present invention is applicable may be a compressed-air type, electromagnetic type or disc-type one. Also, in place of the braking pressure modulator means 90, which in the above embodiment is of a fluid type, a device which uses an electromagnetic force as a driving power may be employed. Further, as a pressure difference detector, unlike the device of the above embodiment which uses not only a switching means consisting of the electrodes 202 and 203 and the movable contact 204, but the diaphragm 97 of the braking pressure modulator means 90 as a switch driving source, the hydraulic piston 95 and the hydraulic pressure cutting valve 93 of the braking pressure modulator means may be used as a driving source of the switching operation. Also, separate from the braking pressure modulator means 90, the difference between the braking pressure in the master cylinder 30 and that in the wheel cylinder 20 may be used to operate a switching means.

What is claimed is:
1. An anti-skid device for automative vehicles comprising:
   a lock detector means for generating a signal to reduce the braking pressure by detecting a state where wheels are going to be locked, said lock detector means including;
   (a) a wheel speed voltage generator for generating a wheel speed voltage corresponding a wheel speed,
   (b) a reference wheel speed voltage generator for generating a reference wheel speed voltage corresponding to a reference wheel speed which, being initially lower than a wheel speed, is reduced at a first decelerating rate with the decrease in wheel speed at the time of braking, and
   (c) a differential amplifier for generating a signal to reduce the braking pressure when said reference wheel speed voltage is higher than said wheel speed voltage;
   a pressure difference detector for generating a signal when the braking pressure of a wheel cylinder is equal to that of a master cylinder;
   a control means for switching said reference wheel speed voltage generator from a first set decelerating rate to a lower set decelerating rate when a signal is generated by said pressure difference detector after the generation of a braking-pressure reducing signal by said differential amplifier; and
   a braking pressure modulator means for reducing the braking pressure according to a signal from said differential amplifier.

2. The anti-skid device according to claim 1 further comprising a changing means adapted to be connected in circuit with said wheel speed voltage generator, said differential amplifier and said control means for applying a signal to said control means when said wheel speed voltage continues to increase for a preset time shorter than said predetermined time after the termination of said braking pressure reducing signal, thereby said control means switching said decreasing rate of the reference wheel speed voltage from said first predetermined value to said second predetermined value when the signal from said changing means is generated during said predetermined time after the termination of said braking pressure reducing signal.

3. The anti-skid device according to claim 2 wherein said electromagnetic means comprises:
   a cylinder body having a first inlet port to which intake manifold pressure is applied, a second inlet port to which atmosphere pressure is applied and an outlet port normally communicating with said first inlet port,
   a piston means disposed slidably within said cylinder body for switching the communication of said outlet port from said first inlet port to said second inlet port, and
   a magnetic coil connected in circuit with said differential amplifier and associated with said piston means to actuate said piston means when energized, atmospheric pressure being thereby supplied to said outlet port from said second inlet port as the output signal;

said breaking pressure modulator means comprises
a first chamber to which intake manifold pressure is applied,
a second chamber communicating with said outlet port,
a diaphragm provided between said first and second chambers,
a hydraulic cylinder having an output port communicating with said wheel cylinder and an input port communicating with said master cylinder, and
a hydraulic piston disposed slidably within said hydraulic cylinder, one end of said piston being adapted to be secured to said diaphragm and the other piston being adapted so as to open or close said inlet port; and
said pressure difference detector comprises a switch means provided in said second chamber for generating said signal when said input port has been opened by the application of intake manifold pressure from said outlet port to said second chamber.

4. The anti-skid device according to claim 1 wherein said braking pressure controlling means comprises an electromagnetic means adapted to be connected in circuit with said differential amplifier for generating an output signal when said braking pressure reducing signal is applied thereto, and a braking pressure modulator means adapted to be connected with said electromagnetic means, said master cylinder and said wheel cylinder for reducing braking pressure applied by said master cylinder to said wheel cylinder when the output signal of said electromagnetic means is applied thereto.

5. An anti-skid device for controlling braking pressure for use with a master cylinder applying pressure to a wheel cylinder of a vehicle comprising:

a wheel speed voltage generator adapted for generating a wheel speed voltage corresponding to a wheel speed,
a reference wheel speed voltage generator adapted to be connected in circuit with said wheel speed voltage generator for generating a reference wheel speed voltage when a decreasing rate of said wheel speed voltage exceeds a first predetermined value, said reference wheel speed voltage decreasing at a rate corresponding to said first predetermined value, starting from an initial value which is lower than that of said wheel speed voltage generated at the instant when the decreasing rate of said wheel speed voltage reaches said first predetermined value,
a differential amplifier adapted to be connected in circuit with said wheel speed voltage generator and said reference wheel speed voltage generator for generating a signal to reduce braking pressure when said reference wheel speed voltage is higher than said wheel speed voltage,
a braking pressure controlling means adapted to be connected in circuit with said differential amplifier and connectable with said master cylinder for reducing braking pressure applied by said master cylinder to said wheel cylinder when the signal from said differential amplifier is applied thereto.
a pressure difference detector interconnected with said braking pressure controlling means for generating a signal when pressure in said wheel cylinder is substantially equal to that in said master cylinder, and
a control means adapted to be connected in circuit with said pressure difference detector, said reference wheel speed voltage generator and said differential amplifier for switching said decreasing rate of the reference wheel speed voltage from said first predetermined value to a second predetermined value when the signal from said pressure difference detector is generated during a predetermined time after the termination of said braking pressure reducing signal from said differential amplifier.

References Cited

UNITED STATES PATENTS

| 3,477,346 | 11/1969 | Slavin et al. | 303—21 F UX |
|---|---|---|---|
| 3,433,536 | 3/1969 | Skinner | 303—21 A |
| 3,588,187 | 6/1971 | Mueller | 303—21 F UX |
| 3,547,501 | 12/1970 | Harned et al. | 303—21 BE |

FOREIGN PATENTS

| 1,810,163 | 11/1968 | Germany | 303—21 BE |

MILTON BUCHLER, Primary Examiner

S. G. KUNIN, Assistant Examiner

U.S. Cl. X.R.

188—181 C; 303—20, 21 BE, 21 F